US012563117B2

(12) United States Patent
Smrtnik et al.

(10) Patent No.: US 12,563,117 B2
(45) Date of Patent: Feb. 24, 2026

(54) DYNAMIC REMOTE PILOT CONNECTIVITY

(71) Applicant: GM GLOBAL TECHNOLOGY OPERATIONS LLC, Detroit, MI (US)

(72) Inventors: Samuel Smrtnik, Lake Orion, MI (US); Mark Lewkowicz, Bloomfield Hills, MI (US); Christopher L. Oesterling, Troy, MI (US); Ian P. Brand, Round Rock, TX (US); John Kowal, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 18/753,276

(22) Filed: Jun. 25, 2024

(65) Prior Publication Data

US 2025/0392642 A1 Dec. 25, 2025

(51) Int. Cl.
| | |
|---|---|
| *H04L 41/12* | (2022.01) |
| *H04L 45/02* | (2022.01) |
| *H04L 67/12* | (2022.01) |
| *H04L 43/0888* | (2022.01) |
| *H04W 16/18* | (2009.01) |

(52) U.S. Cl.
CPC .............. *H04L 67/12* (2013.01); *H04L 41/12* (2013.01); *H04L 43/0888* (2013.01)

(58) Field of Classification Search
CPC ..... H04L 67/12; H04L 41/12; H04L 43/0888; H04L 45/02; H04L 67/42; H04W 16/18; H03L 41/12

USPC ......................................................... 709/224
See application file for complete search history.

(56) References Cited

U.S. PATENT DOCUMENTS

2023/0422049 A1* 12/2023 Kirshon ................ H04L 47/122

FOREIGN PATENT DOCUMENTS

| CN | 118055418 A | 5/2024 |
|---|---|---|
| DE | 102022114454 A1 | 12/2022 |
| DE | 102023123115 A1 | 3/2024 |

* cited by examiner

*Primary Examiner* — Jude Jean Gilles
(74) *Attorney, Agent, or Firm* — Quinn IP Law

(57) ABSTRACT

A system includes network nodes, roadways, vehicles, a computer, and a teledriver facility. The network nodes are distributed along the roadways. Multiple neighboring vehicles reside in segments of the roadways. The vehicle is operational to be driven along the roadways under control of the teledriver facility. The computer is operational to access and dynamically update a connectivity map. The connectivity map identifies multiple data throughputs available between the network nodes and the neighboring vehicles. The computer is further operational to present a route to the teledriver facility to maneuver the vehicle. The route maintains communication between the vehicle and the network nodes with a data connection above a data quality threshold and a data rate threshold. A receiver is disposed in the vehicle to receive driving instructions from the teledriver facility. A drive system is disposed in the vehicle to pilot the vehicle in response to the driving instructions.

20 Claims, 3 Drawing Sheets

DYNAMIC REMOTE PILOT CONNECTIVITY

INTRODUCTION

The present disclosure relates to a system and a method for remote driving of a vehicle generally, and in particular, for dynamic remote pilot connectivity.

Teleoperation of vehicles does not always work as planned due to variables in wireless networks. In some situations, the data throughput between cell towers and the vehicles becomes too low to maintain proper remove driving. In other situations, the data quality between the cell towers and the vehicles becomes too poor for continued remote driving.

Accordingly, those skilled in the art continue with research and development efforts in the field of remove-control driving through areas of variable wireless connectivity.

SUMMARY

A system is provided herein. The system includes a plurality of network nodes, a vehicle, a computer, a receiver, and a drive system. The plurality of network nodes are spatially distributed along a plurality of roadways. Each of the plurality of roadways includes a plurality of segments. A plurality of neighboring vehicles reside in the plurality of segments. The vehicle is operational to be driven along the plurality of roadways to an end location under control of a teledriver facility. The computer is in communication with the plurality of network nodes, is operational to access a connectivity map, and is operational to dynamically update the connectivity map. The connectivity map identifies a plurality of data throughputs available between the plurality of network nodes and the plurality of neighboring vehicles. The computer is further operational to present a route to the teledriver facility to maneuver the vehicle from a current location to the end location. The route maintains communication between the vehicle and the plurality of network nodes with a data connection above a data quality threshold and a data rate threshold. The receiver is disposed in the vehicle and is operational to receive driving instructions from the teledriver facility via the plurality of network nodes. The drive system is disposed in the vehicle and is operational to pilot the vehicle in response to the driving instructions.

In one or more embodiments, the system includes a plurality of navigation systems disposed in the plurality of neighboring vehicles and operational to transfer a plurality of current neighboring locations of the plurality of neighboring vehicles to the computer.

In one or more embodiments of the system, the plurality of neighboring vehicles are operational to measure the plurality of data throughputs with the plurality of network nodes at the plurality of current neighboring locations, and report the plurality of data throughputs as measured to the computer.

In one or more embodiments of the system, the computer is further operational to dynamically update the connectivity map based on the plurality of data throughputs reported by the plurality of neighboring vehicles.

In one or more embodiments of the system, the route is recommended based on a plurality of historical data throughputs reported by the plurality of neighboring vehicles.

In one or more embodiments of the system, the vehicle is further operational to measure the plurality of data throughputs while driving along the route, and report the plurality of data throughputs to the computer once the end location is reached.

In one or more embodiments of the system, the computer is further operational to update the connectivity map in response to the plurality of data throughputs reported from the vehicle.

In one or more embodiments of the system, the computer is further operational to present the route based on an age of the plurality of data throughputs in one or more segments of the plurality of segments exceeding a time threshold to collect fresh data for the one or more segments.

In one or more embodiments of the system, the data quality threshold and the data rate threshold are sufficient to provide teleoperation control of the vehicle.

A method for dynamic remote pilot connectivity is provided herein. The method includes dynamically updating a connectivity map accessible to a computer. The computer is in communication with a plurality of network nodes. The plurality of network nodes are spatially distributed along a plurality of roadways. Each of the plurality of roadways includes a plurality of segments. A plurality of neighboring vehicles reside in the plurality of segments. The connectivity map identifies a plurality of data throughputs available between the plurality of network nodes and a plurality of neighboring vehicles. The method includes recommending a route to a teledriver facility of a vehicle to maneuver the vehicle from a current location to an end location. The vehicle is operational to be guided along the plurality of roadways to the end location under control of the teledriver facility. The route maintains communication between the vehicle and the plurality of network nodes with a data connection above a data quality threshold and a data rate threshold. The method further includes receiving driving instructions at a receiver disposed in the vehicle from the teledriver facility via the plurality of network nodes, and piloting the vehicle in response to the driving instructions.

In one or more embodiments, the method includes transferring a plurality of current neighboring locations of the plurality of neighboring vehicles to the computer.

In one or more embodiments, the method includes measuring the plurality of data throughputs with the plurality of network nodes at the plurality of current neighboring locations with the plurality of neighboring vehicles, and reporting the plurality of data throughputs as measured to the computer.

In one or more embodiments, the method includes dynamically updating the connectivity map based on the plurality of data throughputs reported by the plurality of neighboring vehicles.

In one or more embodiments of the method, the route is recommended based on a plurality of historical data throughputs reported by the plurality of neighboring vehicles.

In one or more embodiments, the method includes measuring the plurality of data throughputs while the vehicle is driving along the route, and reporting the plurality of data throughputs to the computer once the end location is reached.

In one or more embodiments, the method includes updating the connectivity map in response to the plurality of data throughputs reported from the vehicle.

In one or more embodiments, the method includes presenting the route based on an age of the plurality of data throughputs in one or more segments of the plurality of segments exceeding a time threshold to collect fresh data for the one or more segments.

In one or more embodiments of the method, the data quality threshold and the data rate threshold are sufficient to provide teleoperation control of the vehicle.

A vehicle is provided herein. The vehicle includes a wireless link to a computer, a receiver, and a drive system. The computer is operational to access a connectivity map and dynamically update the connectivity map. The computer is in communication with a plurality of network nodes. The plurality of network nodes are spatially distributed along a plurality of roadways. Each of the plurality of roadways includes a plurality of segments. A plurality of neighboring vehicles reside in the plurality of segments. The connectivity map identifies a plurality of data throughputs available between the plurality of network nodes and the plurality of neighboring vehicles. The computer is further operational to recommend a route to a teledriver facility to maneuver the vehicle from a current location to an end location. The route maintains communication between the vehicle and the plurality of network nodes with a data connection above a data quality threshold and a data rate threshold. The receiver is operational to receive driving instructions from the teledriver facility via the plurality of network nodes. The drive system is operational to pilot the vehicle in response to the driving instructions.

In one or more embodiments of the vehicle, the teledriver facility is located external to the vehicle.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a dynamic connectivity map generated from the data network throughput of connected vehicles on a roadway. The data network throughput refers to a rate of quality data transferred over communication channels that ensures optimal routing for the vehicles, particularly for teleoperation and remote vehicle driving. The connectivity map allows selections of routes with sufficient data network throughput for maintaining a stable connection with remotely-operated vehicles. The stable connections are particularly useful when fully-autonomous driving is not possible or does not work properly, as teleoperation may take over with the assurance of a stable connection.

Figure 1:
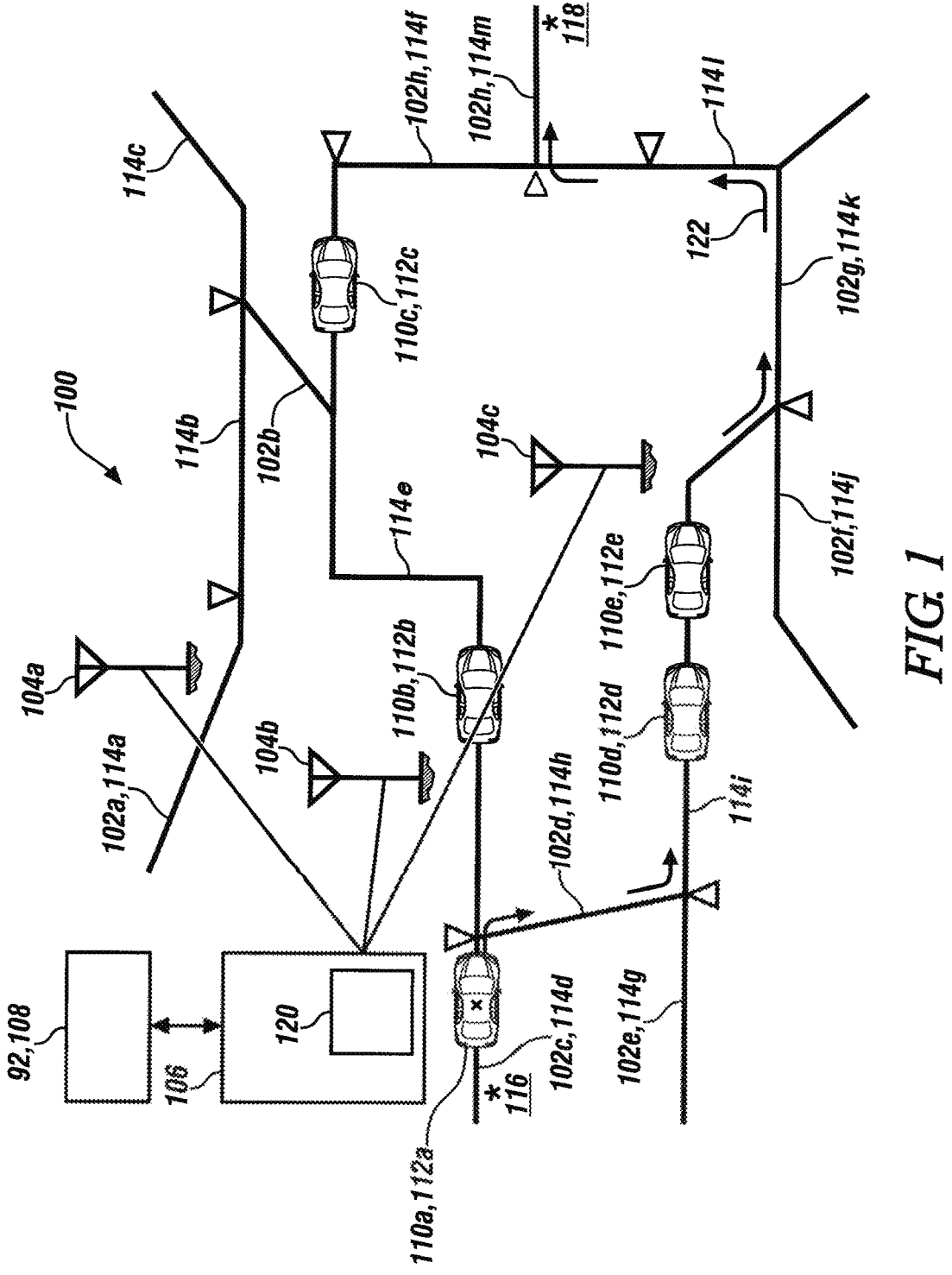
FIG. 1 is a schematic diagram of a system in accordance with one or more exemplary embodiments.

Referring to FIG. 1, a schematic diagram illustrating a context of a system 100 is shown in accordance with one or more exemplary embodiments. The system 100 generally includes multiple roadways 102a-102h, multiple network nodes 104a-104c, a computer 106, a teledriver facility 108, and multiple vehicles 110a-110e.

The roadways 102a-102h implement navigable surfaces. The roadways 102a-102h span from at least a start location 116 to an end location 118. One or more of the roadways 102a-102h may be divided into segments 114a-114m. For example, the roadway 102a may be divided into at least a segment 114a, a segment 114b and a segment 114c. Each segment 114a-114m is within communication range of one or more of the network nodes 104a-104c. For example, the segment 114c may be within range of the network node 104a. The segments 114a, 114d, 114g, 114h and 114i may be within range of the network node 104b, and so on.

The network nodes 104a-104c implement wireless transceiver nodes (or towers). The network nodes 104a-104c are generally operational to communicate via radio-frequency signals with the vehicles 110a-110e on the segments 114a-114m of the roadways 102a-102h. The network nodes 104a-104c may also be operational to communicate with the computer 106. The data items received by the network nodes 104a-104c from the vehicles 110a-110e may be presented to the computer 106. The data received by the network nodes 104a-104c from the computer 106 may be relayed to the vehicles 110a-110e. In various embodiments, the network nodes 104a-104c may be implemented as cellular network nodes. In other embodiments, the network nodes 104a-104c may be implemented as Wi-Fi network nodes and/or WiGig (60 GHz Wi-Fi) nodes. Other types of wireless communication networks may be implemented to meet a design criteria of a particular application.

The computer 106 implements one or a distributed collection of computers. In various embodiments, the computer 106 may be a cloud computer resource. The computer 106 is generally operational to maintain a connectivity map 120, store historical network data throughput values, analyze multiple available routes from the start location 116 and the end location 118 along the roadways 102a-102h, and generate a recommendation for a remote driver 92 in the teledriver facility 108 to pilot the vehicle 110a to the end location 118 based on the available data throughput and the available data quality in the various segments 114a-114m. In various embodiments, the computer 106 is also operational to determine the route based on an age of the data throughputs in one or more segments 114a-114m exceeding a time threshold. The intent is to route through infrequently used segments 114a-114m to collect fresh data for such segments 114a-114m. The updating, analyzing, and recommendation generating may be performed in real-time by the computer (e.g., in less than one second).

The teledriver facility 108 implements a facility external to the vehicles 110a-110e and operational to enable one or more persons to drive one or more vehicles 110a-110e (hereafter the vehicle 110a) via the wireless connections. The teledriver facility 108 uses a combination of cameras and sensors in the vehicle 110a, and augmented reality technology, to remotely pilot the vehicle 110a along the roadways 104a-104c. The person in the teledriver facility 108 may enter the start location 116 (usually a current location 112a of the vehicle 110a) and the end location 118, if available.

In some situations, an occupant 90 of the vehicle 110a may enter the end location 118 where the occupant 90 wants the vehicle 110a to drive. In such a case, the end location 118 may be transferred to the computer 106 via the transmitter and the network nodes 104a-104c. The end location 118 is subsequently used by the computer 106 to determine a route 122 for the vehicle 110a to reach the end location while maintaining data connections above a data quality threshold and a data rate threshold during the trip. The end location 118 may also be updated during the trip. Therefore, the computer 106 may recalculate the route 122 based on the current location 112a of the vehicle 110a and the new end location 118. In the event that the data rate and/or data quality fall below the respective thresholds for the teleoperation control of the vehicle 110a, control of the vehicle 110a may be returned to the occupant 90.

The vehicles 110a-110e implement automobiles (or cars). In various embodiments, the vehicles 110a-110e may communicate wirelessly with the network nodes 104a-104c. The vehicles 110a-110e may also be operational to communicate wirelessly among each other using a vehicle-to-vehicle protocol. The vehicles 110a-110e are further operational to determine a respective current self-location 112a-112e (e.g., a current vehicle location 112a and current neighboring locations 112b-112e) with an onboard navigation system (e.g., a Global Position Satellite receiver). In various embodiments, the vehicles 110a-110e may include, but is not limited to, a passenger vehicle, a truck, an autonomous vehicle, a gas-powered vehicle, an electric-powered vehicle, a hybrid vehicle, a motorcycle, a boat, a farm vehicle, a train and/or an aircraft. The vehicle 110a is operational to be controlled (e.g., steer, accelerate, brake, etc.) by an on-board driver and/or a person in the teledriver facility 108. In some situations, the neighboring vehicles 110b-110e may or may not be remotely piloted.

The connectivity map 120 stores current data quality and current data throughputs available between the network nodes 104a-104c, the vehicles 110a-110e traversing the various segments 114a-114m. The connectivity map 120 may also store historical data quality and historical data throughputs between the network nodes 104a-104c and the vehicles 110a-110e. To measure data throughput performance between the vehicles 110a-110e and the computer 106 (backend), a possible technique is to have each vehicle 110a-110e upload a fixed block of data to the computer 106 from the current self-locations 112a-112e and measure how long the uploads take. In the reverse direction, each vehicle 110a-110e may download another block of data from the computer 106 and measure the download timing and the current self-locations 112a-112e. In another possible technique, the uploading and downloading of the fixed blocks of data may be measured between the vehicles 110a-110e and the network nodes 104a-104c. In various embodiments, delays between the network nodes 104a-104c and the computer 106 may be added to the measurements.

Figure 2:
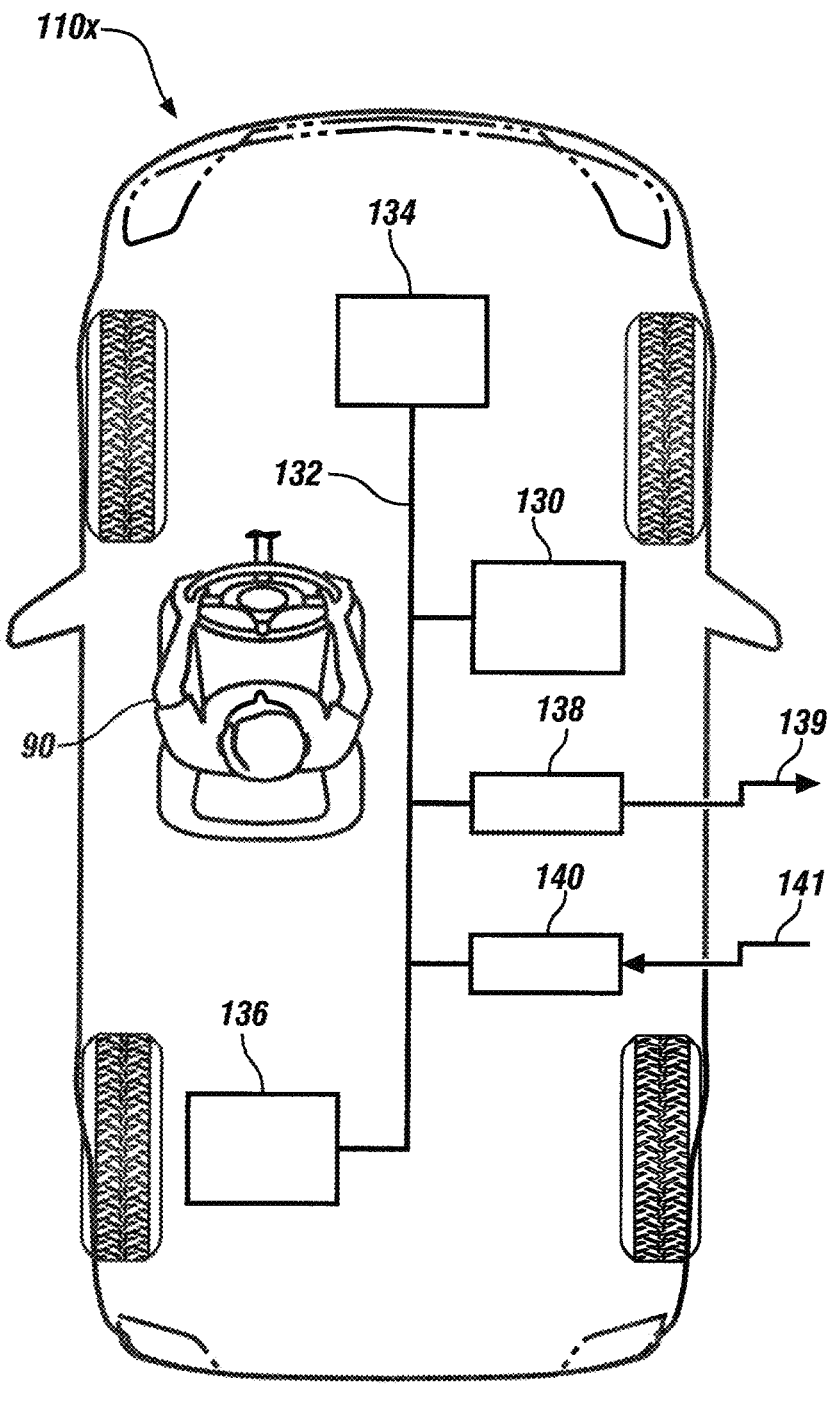
FIG. 2 is a schematic plan diagram of a vehicle in accordance with one or more exemplary embodiments.

Referring to FIG. 2, a schematic plan diagram of an example implementation of a vehicle 110x is shown in accordance with one or more exemplary embodiments. The vehicle 110x may be representative of the vehicle 110a and, optionally, one or more of the vehicles 110b-110e. The vehicle 110x generally includes an electronic control unit 130, a communication bus 132, a drive system 134, a navigation system 136, a transmitter 138 and a receiver 140.

The electronic control unit 130 implements one or more processing circuits. The electronic control unit 130 is operational to present a current location (e.g., the current location 112a of the vehicle 110a) and report a data quality and a data rate for the communications with the network nodes 104a-104c to the computer 106 via transmitter 138 and the network nodes 104a-104c. The electronic control unit 130 may receive driving directions from the teledriver facility 108 via the network nodes 104a-104c and the receiver 140. The driving instructions may be relayed to the drive system 134 via the communication bus 132.

In various embodiments, the electronic control unit 130 generally includes at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be an electronic processor (implemented in hardware, software executing on hardware, or a combination of both). The at least one microcontroller may also include tangible, nontransitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the at least one microcontroller (either in the foreground or background). The at least one microcontroller may receive commands and information, in the form of one or more input signals from various controls or components and communicate instructions to the other electronic components.

The communication bus 132 implements a multi-node, bidirectional digital bus. The communication bus 132 is operational to exchange data among the electronic control unit 130, the navigation system 136, the transmitter 138 and the receiver 140.

The drive system 134 implements a semi-autonomous drive system. The drive system 134 is operational to control a steering, acceleration, braking, and gear shifting of the vehicle 110x based on drive commands received via the communication bus 132.

The navigation system 136 implements an inertial navigation system and/or a satellite navigation system (e.g., a Global Positioning System receiver). The navigation system 136 is operational to determine the current location (e.g., the current location 112a of the vehicle 110a). The current location may be transferred to the computer 106 via the transmitter 138 and the network nodes 104a-104c.

The transmitter 138 is operational to transmit outgoing signals 139 to the network nodes 104a-104c. Data in the outgoing signals 139 is received at the transmitter 138 via the communication bus 132. In some embodiments, the outgoing signals 139 may be destined for other vehicles 110a-110c.

The receiver 140 is operational to receive incoming signals 141 from the network nodes 104a-104n. Data in the incoming signals 141 is transferred to the electronic control unit 130 and/or the drive system 134 via the communication bus 132. In various embodiments, the incoming signals 141 may be received from other vehicles 110a-110c. The transmitter 138 and the receiver 140 generally establish a wireless link between the vehicle 110x and the computer 106.

Additional circuitry may be implemented in the vehicle 110x. For example, the additional circuitry may be operational to assist a driver of the vehicle 110x in terms of speed and/or direction based on images received from the camera. In some embodiments, the additional circuitry may implement automatic braking functions that respond to obstacles appearing in the images ahead of the vehicle 110x and subsequently slow and/or stop the vehicle 110x. In other embodiments, the additional circuitry may implement steering assistance functions that aid in maintaining the vehicles 110x centered in traffic lanes on the ground. In still other embodiments, the additional circuits may implement semi-automatic and/or autonomous driving functions. Other functions, such as perception, localization and/or mapping may be implemented in the additional circuitry to meet the design criteria of a particular application.

Figure 3:
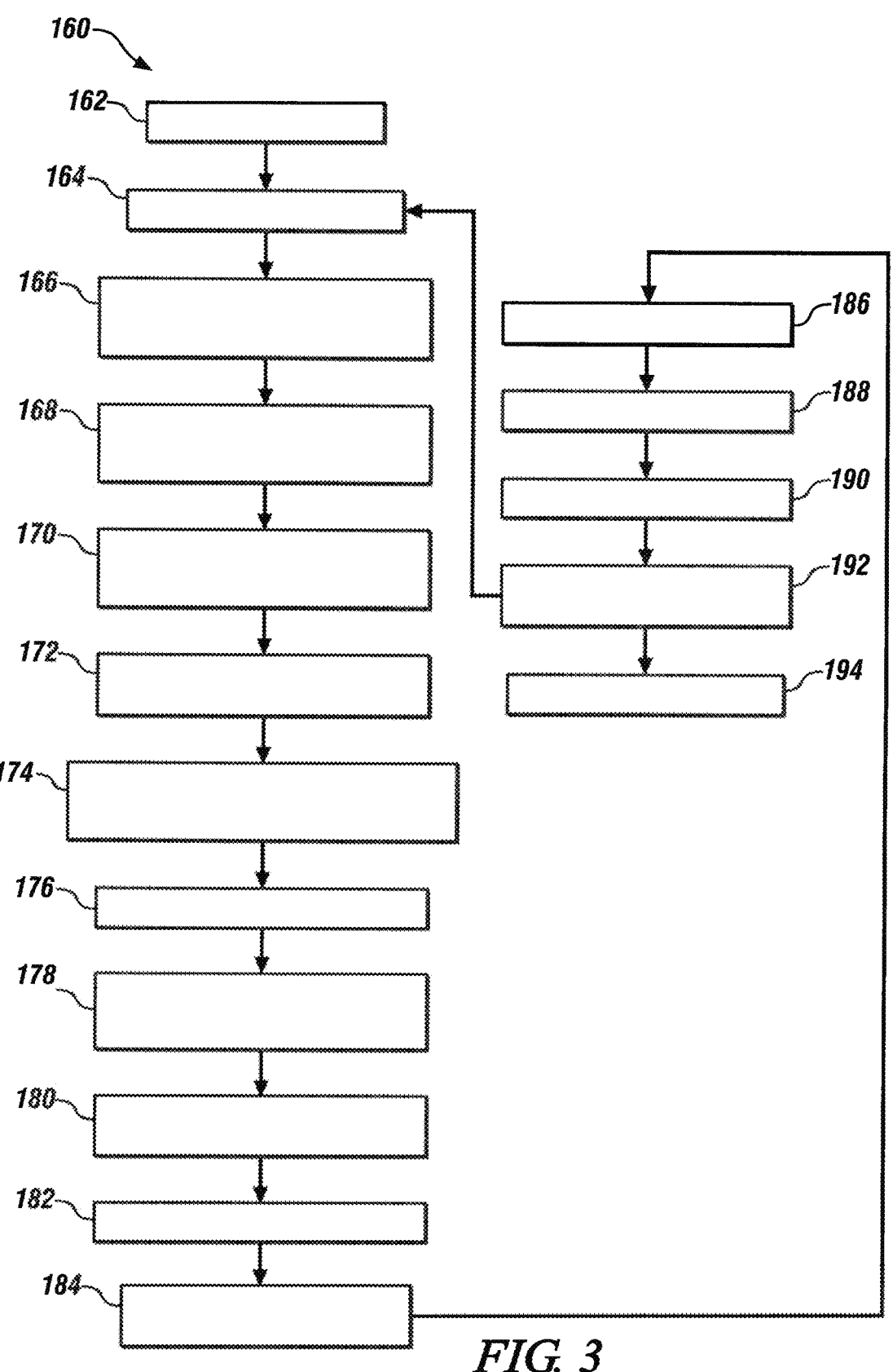
FIG. 3 is a flow diagram of a method of operation of the system in accordance with one or more exemplary embodiments.

Referring to FIG. 3, a flow diagram of an example method 160 of operation of the system 100 is shown in accordance with one or more exemplary embodiments. The method 160 generally includes steps 162 to 194. The sequence of steps is shown as a representative example. Other step orders may be implemented to meet the criteria of a particular application. The method 160 is implemented by the system 100.

In the step 162, the occupant 90 of the vehicle 110a may start the vehicle 110a. The start location 116/current location 112a of the vehicle 110a is determined by the navigation system 136, the end (or desired) location 118 is entered by the occupant 90 in the vehicle 110a and, alternatively, the end location 118 is entered by the remote driver in the teledriver facility 108 in the step 164. The connectivity map 120 is accessed by the computer 106 in the step 166. The computer 106 uses data in the connectivity map 120, the current location 112a of the vehicle 110a, the end location 118 previously entered to determine an initial route.

In the step 168, the computer 106 scans and monitors the vehicles 110a-110e in the area based on highest data network throughput. In the step 170, the computer 106 scans historical data while cross-referencing real-time data network throughput. Vehicles 110a-110e with strong connectivity and optimal positioning along the roadways 102a-102h are identified in the step 172.

In the step 174, the computer 106 collects feedback from vehicles 110a-110e and reads the historical data to generate a best route 122 for the current operation. The route 122 generally maintains the data throughput rate at or above the data throughput threshold and the data quality at or above the data quality threshold to ensure reliably remove control of the vehicle 110a. Where multiple routes 122 satisfy the threshold criteria, a route with the highest data throughput may be selected.

The route 122 generated by the computer is transferred to the teledriver facility 108 for display to the (remote) driver in the step 176. The computer 106 may alter the route 122 while the vehicle 110a is in motion in the step 178 if a higher data network throughput for the particular area around the vehicle 110a becomes available. In addition, the vehicle 110a may download driving instructions based on the altered route in the step 180. While the vehicles 110a-110e are on the roadways 102a-102h, the vehicles 110a-110e may measure and upload respective data throughput rates and data quality values to the computer 106 in the step 182 based on respective geolocations. The data network throughput and quality ensures teleoperation take over per the step 184.

In the step 186, the vehicle 110a arrives at the end location 118 (e.g., the intended destination) and reports the current location 112a to the computer 106. The computer 106 recognizes the vehicle 110a arriving at the end location 118 in the step 188 and stops sending driving instructions to the vehicle 110a. The vehicle 110a subsequently creates a historic report of the trip in the step 190 and uploads the historic report to the computer 106 in the step 192. The vehicle 110a may be switched off in the step 194.

The dynamic generation of the connectivity map 120 is generally based on real-time sensor data from the vehicles 110a-110e, and is used for route planning. The real-time sensor data allows for predictive adjustments to switch networks to ensure continuous optimal data network throughput and data quality for the remote-operated vehicle 110a. Additionally, the route 122 may be dynamically altered in real-time while the vehicle 110a is in motion. The vehicles 110a-110e also proactively report upload data and download data based on the geo-location. Historical network throughput information and historic data quality is also stored. Therefore, at a given time of day and a current location, there may be a confidence level for that time and location based on the aggregated data. As such, the dynamically updating of the connectivity map 120 for routing is based on historical and/or current data network throughput results unique the vehicle performance.

Embodiments of the disclosure generally provides a system for dynamic remote pilot connectivity. The system includes multiple network nodes, multiple roadways, multiple vehicles, a computer, and a teledriver facility. The network nodes are spatially distributed along the roadways. Each roadway includes multiple segments. Multiple neighboring vehicles reside in the segments. The vehicle is operational to be driven along the roadways to an end location under control of the teledriver facility. The computer is in communication with the network nodes, operational to access a connectivity map, and operational to dynamically update the connectivity map. The connectivity map identifies multiple data throughputs available between the network nodes and the neighboring vehicles. The computer is further operational to present a route to the teledriver facility to maneuver the vehicle from a current location to the end location. The route maintains communication between the vehicle and the network nodes with a data connection above a data quality threshold and a data rate threshold. A receiver is disposed in the vehicle and is operational to receive driving instructions from the teledriver facility via the network nodes. A drive system is disposed in the vehicle and is operational to pilot the vehicle in response to the driving instructions.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:

a plurality of network nodes spatially distributed along a plurality of roadways, wherein:

each of the plurality of roadways includes a plurality of segments; and a plurality of neighboring vehicles reside in the plurality of segments;

a vehicle operational to be driven along the plurality of roadways to an end location under control of a teledriver facility; and a computer in communication with the plurality of network nodes, operational to access a connectivity map, and operational to dynamically update the connectivity map, wherein:

the connectivity map identifies a plurality of data throughputs available between the plurality of network nodes and the plurality of neighboring vehicles; and the computer is further operational to present a route to the teledriver facility to maneuver the vehicle from a current location to the end location; and the route maintains communication between the vehicle and the plurality of network nodes with a data connection above a data quality threshold and a data rate threshold;

a receiver disposed in the vehicle and operational to receive driving instructions from the teledriver facility via the plurality of network nodes; and a drive system disposed in the vehicle and operational to pilot the vehicle in response to the driving instructions.

2. The system according to claim 1, further comprising:

a plurality of navigation systems disposed in the plurality of neighboring vehicles and operational to transfer a plurality of current neighboring locations of the plurality of neighboring vehicles to the computer.

3. The system according to claim 2, wherein:

the plurality of neighboring vehicles are operational to measure the plurality of data throughputs with the plurality of network nodes at the plurality of current neighboring locations; and report the plurality of data throughputs as measured to the computer.

4. The system according to claim 3, wherein:

the computer is further operational to dynamically update the connectivity map based on the plurality of data throughputs reported by the plurality of neighboring vehicles.

5. The system according to claim 1, wherein:

the route is recommended based on a plurality of historical data throughputs reported by the plurality of neighboring vehicles.

6. The system according to claim 1, wherein:

the vehicle is further operational to measure the plurality of data throughputs while driving along the route; and report the plurality of data throughputs to the computer once the end location is reached.

7. The system according to claim 6, wherein:

the computer is further operational to update the connectivity map in response to the plurality of data throughputs reported from the vehicle.

8. The system according to claim 1, wherein:

the computer is further operational to present the route based on an age of the plurality of data throughputs in one or more segments of the plurality of segments exceeding a time threshold to collect fresh data for the one or more segments.

9. The system according to claim 1, wherein:

the data quality threshold and the data rate threshold are sufficient to provide teleoperation control of the vehicle.

10. A method for dynamic remote pilot connectivity comprising:

dynamically updating a connectivity map accessible to a computer, wherein:

the computer is in communication with a plurality of network nodes;

the plurality of network nodes are spatially distributed along a plurality of roadways;

each of the plurality of roadways includes a plurality of segments;

a plurality of neighboring vehicles reside in the plurality of segments;

the connectivity map identifies a plurality of data throughputs available between the plurality of network nodes and a plurality of neighboring vehicles;

recommending a route to a teledriver facility of a vehicle to maneuver the vehicle from a current location to an end location, wherein:

the vehicle is operational to be guided along the plurality of roadways to the end location under control of the teledriver facility; and the route maintains communication between the vehicle and the plurality of network nodes with a data connection above a data quality threshold and a data rate threshold;

receiving driving instructions at a receiver disposed in the vehicle from the teledriver facility via the plurality of network nodes; and piloting the vehicle in response to the driving instructions.

11. The method according to claim 10, further comprising:

transferring a plurality of current neighboring locations of the plurality of neighboring vehicles to the computer.

12. The method according to claim 11, further comprising:

measuring the plurality of data throughputs with the plurality of network nodes at the plurality of current neighboring locations with the plurality of neighboring vehicles; and reporting the plurality of data throughputs as measured to the computer.

13. The method according to claim 12, further comprising:

dynamically updating the connectivity map based on the plurality of data throughputs reported by the plurality of neighboring vehicles.

14. The method according to claim 10, wherein:

the route is recommended based on a plurality of historical data throughputs reported by the plurality of neighboring vehicles.

15. The method according to claim 10, further comprising:

measuring the plurality of data throughputs while the vehicle is driving along the route; and reporting the plurality of data throughputs to the computer once the end location is reached.

16. The method according to claim 15, further comprising:

updating the connectivity map in response to the plurality of data throughputs reported from the vehicle.

17. The method according to claim 10, further comprising:

presenting the route based on an age of the plurality of data throughputs in one or more segments of the plurality of segments exceeding a time threshold to collect fresh data for the one or more segments.

18. The method according to claim 10, wherein:

the data quality threshold and the data rate threshold are sufficient to provide teleoperation control of the vehicle.

19. A vehicle comprising:

a wireless link to a computer operational to access a connectivity map and dynamically update the connectivity map, wherein:

the computer is in communication with a plurality of network nodes;

the plurality of network nodes are spatially distributed along a plurality of roadways;

each of the plurality of roadways includes a plurality of segments;

a plurality of neighboring vehicles reside in the plurality of segments;

the connectivity map identifies a plurality of data throughputs available between the plurality of network nodes and the plurality of neighboring vehicles;

the computer is further operational to recommend a route to a teledriver facility to maneuver the vehicle from a current location to an end location; and the route maintains communication between the vehicle and the plurality of network nodes with a data connection above a data quality threshold and a data rate threshold;

a receiver operational to receive driving instructions from the teledriver facility via the plurality of network nodes; and a drive system operational to pilot the vehicle in response to the driving instructions.

20. The vehicle according to claim 19, wherein:

the teledriver facility is located external to the vehicle.

*    *    *    *    *